US011762079B2

(12) United States Patent
Crouch et al.

(10) Patent No.: US 11,762,079 B2
(45) Date of Patent: Sep. 19, 2023

(54) DISTRIBUTED RADAR ANTENNA ARRAY APERTURE

(71) Applicant: Aurora Innovation, Inc., Palo Alto, CA (US)

(72) Inventors: Stephen Crouch, Bozeman, MT (US); Chunshu Li, San Jose, CA (US)

(73) Assignee: AURORA OPERATIONS, INC., Mountain View, CA (US)

( * ) Notice: Subject to any disclaimer, the term of this patent is extended or adjusted under 35 U.S.C. 154(b) by 281 days.

(21) Appl. No.: 17/132,071

(22) Filed: Dec. 23, 2020

(65) Prior Publication Data

US 2022/0099817 A1 Mar. 31, 2022

Related U.S. Application Data

(60) Provisional application No. 63/085,833, filed on Sep. 30, 2020.

(51) Int. Cl.
*G01S 13/42* (2006.01)
*G01S 13/931* (2020.01)
*G01S 13/58* (2006.01)
*G01S 7/35* (2006.01)
*G01S 13/87* (2006.01)

(52) U.S. Cl.
CPC ........... *G01S 13/426* (2013.01); *G01S 7/354* (2013.01); *G01S 13/584* (2013.01); *G01S 13/931* (2013.01); *G01S 7/356* (2021.05); *G01S 13/42* (2013.01); *G01S 13/878* (2013.01)

(58) Field of Classification Search
CPC ...... G01S 13/426; G01S 7/354; G01S 13/584; G01S 13/931; G01S 7/356; G01S 13/42; G01S 13/878
See application file for complete search history.

(56) References Cited

U.S. PATENT DOCUMENTS

| 10,401,495 | B2 | 9/2019 | Crouch | |
| 2015/0253420 | A1* | 9/2015 | Alland | G01S 7/03 |
| | | | | 342/156 |
| 2017/0176583 | A1 | 6/2017 | Gulden | |
| 2018/0128912 | A1 | 5/2018 | Bialer | |
| 2019/0101634 | A1* | 4/2019 | Baheti | G01S 13/62 |

(Continued)

FOREIGN PATENT DOCUMENTS

| DE | 102018207718 | | 11/2019 | | |
| DE | 102018210070 | A1 * | 12/2019 | ........... | G01S 13/325 |

(Continued)

OTHER PUBLICATIONS

European Patent Office, International Search Report and Written Opinion for PCT/US2021/052639 dated Dec. 22, 2021.

(Continued)

*Primary Examiner* — Timothy A Brainard
*Assistant Examiner* — Ismaaeel A. Siddiquee
(74) *Attorney, Agent, or Firm* — Gray Ice Higdon

(57) ABSTRACT

A vehicle radar system utilizes multiple radar sensors having overlapping fields of view to effectively synthesize a distributed radar antenna array aperture from the outputs of the multiple radar sensors and effectively enhance one or more of angular resolution, detection range and signal to noise ratio beyond that supported by any of the radar sensors individually.

20 Claims, 5 Drawing Sheets

(56) References Cited

U.S. PATENT DOCUMENTS

| | | | | |
|---|---|---|---|---|
| 2019/0235051 | A1* | 8/2019 | Melzer | G01S 13/343 |
| 2019/0339388 | A1 | 11/2019 | Crouch | |
| 2020/0132798 | A1* | 4/2020 | Tomioka | G01S 3/50 |
| 2020/0292666 | A1 | 9/2020 | Maher | |
| 2020/0300995 | A1 | 9/2020 | Wu | |
| 2021/0149041 | A1* | 5/2021 | Cho | G01S 7/417 |
| 2021/0405183 | A1* | 12/2021 | Vossiek | G01S 13/003 |
| 2022/0099795 | A1 | 3/2022 | Crouch et al. | |
| 2022/0111853 | A1* | 4/2022 | Zhou | G06T 7/62 |

FOREIGN PATENT DOCUMENTS

| | | |
|---|---|---|
| EP | 3652497 | 5/2020 |
| EP | 3690483 | 8/2020 |
| LU | 100130 | 9/2018 |
| WO | 2019014177 | 1/2019 |
| WO | WO 2019126386 | 6/2019 |
| WO | 2022072485 | 4/2022 |
| WO | 2022072488 | 4/2022 |

OTHER PUBLICATIONS

Wikipedia; MIMO Radar, last updated Dec. 16, 2020.
Giannini et al; "A 79 GHz Phase-Modulated 4 GHz-BW CW Radar Transmitter in 28 nm CMOS," in IEEE Journal of Solid-State Circuits, vol. 49, No. 12, pp. 2925-2937, Dec. 2014.
Bourdoux et al; "PMCW waveform and MIMO technique for a 79 GHz CMOS automotive radar," 2016 IEEE Radar Conference (RadarConf), Philadelphia, PA, 2016, pp. 1-5.
Overdevest et al; "Doppler Influence on Waveform Orthogonality in 79 GHz MIMO Phase-Coded Automotive Radar," in IEEE Transactions on Vehicular Technology, vol. 69, No. 1, pp. 16-25, Jan. 2020.
Pfeffer et al; "FMCW MIMO Radar System for Frequency-Division Multiple TX-Beamforming," in IEEE Transactions on Microwave Theory and Techniques, vol. 61, No. 12, pp. 4262-4274, Dec. 2013.
Texas Instruments; Application Report—AWR2243 Cascade; Oct. 2017.
Och et al; "A Scalable 77 GHz Massive MIMO FMCW Radar by Cascading Fully-Integrated Transceivers," 2018 Asia-Pacific Microwave Conference (APMC), Kyoto, 2018, pp. 1235-1237.
Texas Instruments; "mmWave cascade imaging radar RF evaluation module"; https://www.ti.com/tool/MMWCAS-RF-EVM [retrieved from internet wayback machine]; Oct. 9, 2019.
Texas Instruments; "AWR1843"; https://www.ti.com/tool/MMWCAS-RF-EVM [retrieved from internet wayback machine]; Jan. 10, 2019.
"Guermandi et al., ""'A 79GHz 2x2 MIMO PMCW radar SoC in 28nm CMOS,'" 2016 IEEE AsianSolid-State Circuits Conference (A-SSCC), Toyama, 2016, pp. 105-108, doi:10.1109/ASSCC.2016.7844146.".
European Patent Office, International Search Report and Written Opinion for PCT/US2021/052642 dated Jan. 19, 2022.

* cited by examiner

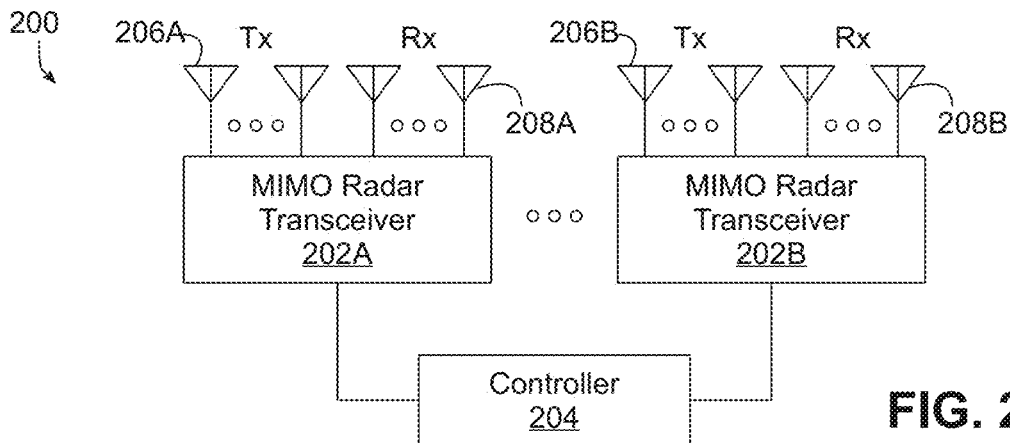
FIG. 2
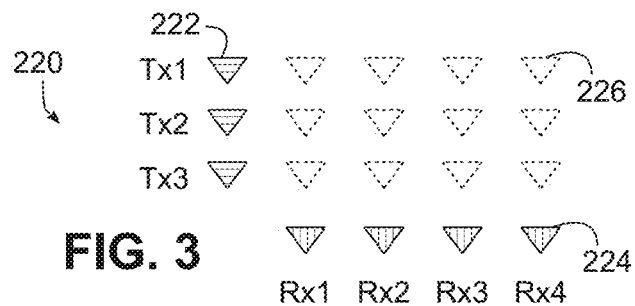
FIG. 3
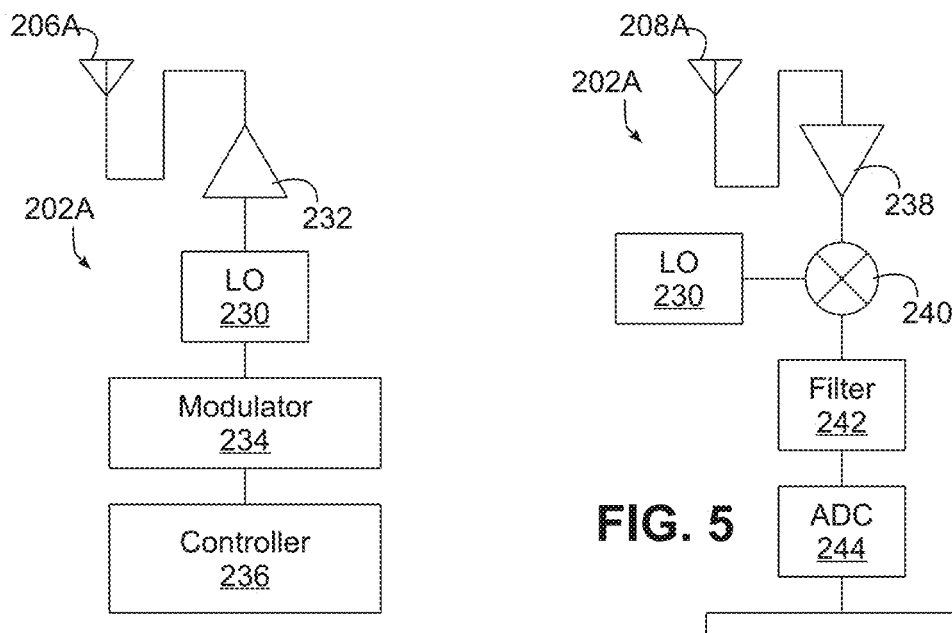
FIG. 4
FIG. 5

DISTRIBUTED RADAR ANTENNA ARRAY APERTURE

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate mapping data exists). Finally, Level 5 autonomy represents a level of autonomy where a vehicle is capable of operating free of operator control under any circumstances where a human operator could also operate.

The fundamental challenges of any autonomy-related technology relate to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

One particular technology that is increasingly relied upon for collecting information about a vehicle's surrounding environment is radar, which is based on the emission, reflection and sensing of radio wave electromagnetic radiation within an environment to detect, and in some instances, determine the position and velocity of various objects within the environment. Despite continuing improvements to radar performance, however, both cost and technical limitations continue to exist, so a continuing need exists for improvements to radar technology, and particularly for radar technology used in connection with the control of an autonomous vehicle.

SUMMARY

The present disclosure is generally related to a radar system for automotive purposes including autonomous vehicles. In particular, multiple radar sensors with overlapping fields of view may be used to effectively synthesize a distributed radar antenna array aperture from the transmitters and receivers of the multiple radar sensors and effectively enhance one or more of angular resolution, detection range and signal to noise ratio beyond that supported by any of the radar sensors individually. In some instances, the techniques described herein may be used to enable radar sensors that otherwise would have insufficient angular resolution on their own to adequately discriminate between various objects in the environment of an autonomous or other vehicle to be used collectively by a vehicle control system in connection with the autonomous control of a vehicle.

Therefore, consistent with one aspect of the invention, a method may include receiving first radar data from a first multiple input multiple output (MIMO) radar sensor disposed on a vehicle, the first MIMO radar sensor including one or more transmit antennas and one or more receive antennas forming a first radar sub-array, and the first radar data including first point data identifying one or more points sensed by the first MIMO radar sensor and first beamforming data from the first radar sub-array, receiving second radar data from a second MIMO radar sensor disposed on the vehicle, the second MIMO radar sensor having a field of view that overlaps with that of the first MIMO radar sensor and including one or more transmit antennas and one or more receive antennas forming a second radar sub-array, and the second radar data including second point data identifying one or more points sensed by the second MIMO radar sensor and second beamforming data from the second radar sub-array, and synthesizing a distributed array from the first and second radar sub-arrays by applying a phase correction that compensates for temporal or spatial mismatches between the first and second radar sub-arrays using the first and second point data and the first and second beamforming data and thereafter performing a beamforming operation on one or more points in the first or second point data after the phase correction is applied.

In some implementations, the first and second MIMO radar sensors operate using separate local oscillators. Also, in some implementations, the first and second MIMO radar sensors operate using separate clocks. Further, in some implementations, the first point data includes a point cloud, the point cloud identifying a position and a velocity for each of the one or more points sensed by the first MIMO radar sensor.

In some implementations, the first beamforming data includes a beamvector for each of the one or more points sensed by the first MIMO radar sensor and the second beamforming data includes a beamvector for each of the one or more points sensed by the second MIMO radar sensor. In addition, in some implementations, synthesizing the distributed array further includes identifying one or more correlated points from the first and second point data, and applying the phase correction includes generating a set of ideal beamvectors for one of the first and second radar sensors based upon the identified one or more correlated points, and generating the phase correction by comparing the set of ideal beamvectors to the beamvectors in the first and second beamforming data.

In some implementations, performing the beamforming operation refines a position of at least one of the one or more points in the first or second point data. In addition, in some implementations, performing the beamforming operation determines an additional point.

Moreover, in some implementations, identifying the one or more correlated points is performed using a nearest neighbor spatial matching algorithm based on range, Doppler and angle of arrival correspondence between points in the first and second point data.

Consistent with another aspect of the invention, a vehicle radar system may include a memory, one or more processors, and program code resident in the memory and configured upon execution by the one or more processors to receive first radar data from a first multiple input multiple output (MIMO) radar sensor disposed on the vehicle, the first MIMO radar sensor including one or more transmit antennas and one or more receive antennas forming a first radar sub-array, and the first radar data including first point data identifying one or more points sensed by the first MIMO radar sensor and first beamforming data from the first radar sub-array, receive second radar data from a second MIMO radar sensor disposed on the vehicle, the second MIMO radar sensor having a field of view that overlaps with that of the first MIMO radar sensor and including one or more transmit antennas and one or more receive antennas forming a second radar sub-array, and the second radar data including second point data identifying one or more points sensed by the second MIMO radar sensor and second beamforming data from the second radar sub-array, and synthesize a distributed array from the first and second radar sub-arrays by applying a phase correction that compensates for temporal or spatial mismatches between the first and second radar sub-arrays using the first and second point data and the first and second beamforming data and thereafter performing a beamforming operation on one or more points in the first or second point data after the phase correction is applied.

Some implementations may also include the first MIMO radar sensor. In some implementations, the one or more processors are disposed in the first MIMO radar sensor. Some implementations may further include the second MIMO radar sensor, where the one or more processors are disposed external of each of the first and second MIMO radar sensors. In some implementations, the first and second MIMO radar sensors operate using separate local oscillators. In addition, in some implementations, the first and second MIMO radar sensors operate using separate clocks.

In some implementations, the first point data includes a point cloud, the point cloud identifying a position and a velocity for each of the one or more points sensed by the first MIMO radar sensor. Moreover, in some implementations, the first beamforming data includes a beamvector for each of the one or more points sensed by the first MIMO radar sensor and the second beamforming data includes a beamvector for each of the one or more points sensed by the second MIMO radar sensor. Also, in some implementations, the program code is configured to synthesize the distributed array further by identifying one or more correlated points from the first and second point data, and the program code is configured to apply the phase correction by generating a set of ideal beamvectors for one of the first and second radar sensors based upon the identified one or more correlated points, and generating the phase correction by comparing the set of ideal beamvectors to the beamvectors in the first and second beamforming data.

In some implementations, the beamforming operation refines a position of at least one of the one or more points in the first or second point data. In addition, in some implementations, the beamforming operation determines an additional point. Also, in some implementations, the program code is configured to identify the one or more correlated points using a nearest neighbor spatial matching algorithm based on range, Doppler and angle of arrival correspondence between points in the first and second point data.

Consistent with another aspect of the invention, a program product may include a non-transitory computer readable medium, and program code stored on the non-transitory computer readable medium and configured upon execution by one or more processors to receive first radar data from a first multiple input multiple output (MIMO) radar sensor disposed on the vehicle, the first MIMO radar sensor including one or more transmit antennas and one or more receive antennas forming a first radar sub-array, and the first radar data including first point data identifying one or more points sensed by the first MIMO radar sensor and first beamforming data from the first radar sub-array, receive second radar data from a second MIMO radar sensor disposed on the vehicle, the second MIMO radar sensor having a field of view that overlaps with that of the first MIMO radar sensor and including one or more transmit antennas and one or more receive antennas forming a second radar sub-array, and the second radar data including second point data identifying one or more points sensed by the second MIMO radar sensor and second beamforming data from the second radar sub-array, and synthesize a distributed array from the first and second radar sub-arrays by applying a phase correction that compensates for temporal or spatial mismatches between the first and second radar sub-arrays using the first and second point data and the first and second beamforming data and thereafter performing a beamforming operation on one or more points in the first or second point data after the phase correction is applied.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 illustrates an example implementation of a Multiple Input Multiple Output (MIMO) radar sensor that may be utilized by implementations disclosed herein.

FIG. 3 illustrates an example virtual antenna array capable of being produced by a MIMO radar sensor that may be utilized by implementations disclosed herein.

FIG. 4 illustrates an example transmitter channel for the MIMO radar sensor of FIG. 2.

FIG. 5 illustrates an example receiver channel for the MIMO radar sensor of FIG. 2.

DETAILED DESCRIPTION

The herein-described implementations are generally directed to various improvements associated with multiple input multiple output (MIMO) radar sensors, e.g., for use in connection with the control of an autonomous or other type of vehicle, among other applications. Prior to discussing such improvements, however, a brief discussion of an autonomous vehicle environment and of MIMO radar sensors are provided below.

Autonomous Vehicle Environment

Figure 1:
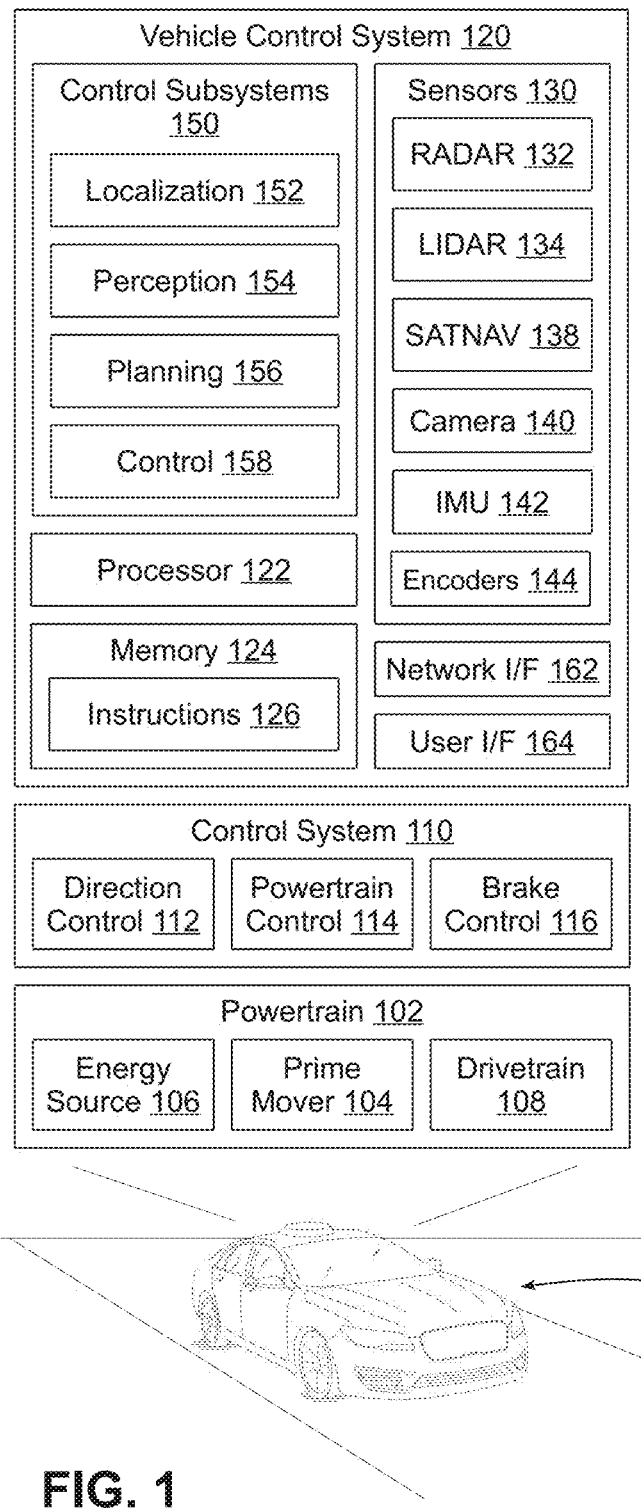
FIG. 1 illustrates an example environment in which implementations disclosed herein can be implemented.

Turning to the Drawings, wherein like numbers denote like parts throughout the several views, FIG. 1 illustrates an autonomous vehicle 100 suitable for utilizing the various techniques described herein. Vehicle 100, for example, may include a powertrain 102 including a prime mover 104 powered by an energy source 106 and capable of providing power to a drivetrain 108, as well as a control system 110 including a direction control 112, a powertrain control 114, and brake control 116. Vehicle 100 may be implemented as any number of different types of vehicles, including vehicles capable of transporting one or both of people and cargo, and it will be appreciated that the aforementioned components 102-116 may vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors, an internal combustion engine, or a combination thereof (among others). The energy source 106 may include, for example, one or more of a fuel system (e.g., providing gasoline, diesel, hydrogen, etc.), a battery system, solar panels or other renewable energy source, and a fuel cell system. Drivetrain 108 may include one or more of wheels, tires, a transmission and any other mechanical drive components suitable for converting the output of prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

Direction control 112 may include one or more actuators, one or more sensors, or a combination thereof for controlling and receiving feedback from the direction or steering components to enable the vehicle 100 to follow a desired trajectory. Powertrain control 114 may be configured to control the output of powertrain 102, e.g., to control the output power of prime mover 104, to control a gear of a transmission in drivetrain 108, etc., thereby controlling one or more of a speed and direction of the vehicle 100. Brake control 116 may be configured to control one or more brakes that slow or stop vehicle 100, e.g., disk or drum brakes coupled to the wheels of the vehicle.

Other vehicle types will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, implementations disclosed herein not limited to the particular application of the herein-described techniques in an autonomous wheeled land vehicle.

In the illustrated implementation, full or semi-autonomous control over vehicle 100 is implemented in a vehicle control system 120, which may include one or more processors 122 and one or more memories 124, with each processor 122 configured to execute program code instructions 126 stored in a memory 124. The processor(s) 122 may include, for example, one or more graphics processing units (GPUs), one or more central processing units (CPUs), or a combination thereof.

Sensors 130 may include various sensors suitable for collecting information from a vehicle's surrounding environment for use in controlling the operation of the vehicle. For example, sensors 130 may include one or more Radio Detection and Ranging (RADAR) sensors, with which a number of the techniques described herein may be implemented.

Sensors 130 may also optionally include one or more Light Detection and Ranging (LIDAR) sensors 132, as well as one or more satellite navigation (SATNAV) sensors 138, e.g., compatible with any of various satellite navigation systems such as GPS, GLONASS, Galileo, Compass, etc. Each SATNAV sensor 138 may be used to determine the location of the vehicle on the Earth using satellite signals. Sensors 130 may also optionally include one or more cameras 140, one or more inertial measurement units (IMUS) 142, one or more wheel encoders 144, or a combination thereof. Each camera 140 may be a monographic or stereographic camera and may record one or more of still and video imagers. Each IMU 142 may include multiple gyroscopes and accelerometers capable of detecting linear and rotational motion of the vehicle 100 in three directions. Wheel encoders 144 may be used to monitor the rotation of one or more wheels of vehicle 100.

The outputs of sensors 130 may be provided to a set of control subsystems 150, including, for example, a localization subsystem 152, a perception subsystem 154, a planning subsystem 156, and a control subsystem 158. As will become more apparent hereinafter, radar sensors 132 may be used by one or more of such subsystems 152-158 to control an autonomous vehicle.

Localization subsystem 152 may be principally responsible for precisely determining the location and orientation (also sometimes referred to as "pose") of vehicle 100 within its surrounding environment, and generally within some frame of reference.

Perception subsystem 154 may be principally responsible for detecting, tracking and identifying elements within the environment surrounding vehicle 100. For example, perception subsystem 154 may, at each of a plurality of iterations, determine a pose, classification, and velocity for each of one or more objects in the environment surrounding vehicle 100. Further, for example, the perception subsystem 154 may track various objects over multiple iterations. For instance, the perception subsystem 154 may track an additional vehicle over multiple iterations as the additional vehicle moves relative to vehicle 100.

Planning subsystem 156 may be principally responsible for planning a trajectory for vehicle 100 over some timeframe given a desired destination as well as the static and moving objects within the environment. For example, and as described herein, planning subsystem 156 may plan a trajectory for vehicle 100 based at least in part on one or more of a pose, classification, and velocity for each of one or more objects in an environment of the vehicle 100 in the environment surrounding vehicle 100. In some implementations, planning subsystem 156 may plan the trajectory for the vehicle 100 by generating, and considering, candidate trajectories for each of one or more additional mobile objects in the environment. Planning subsystem 156 may determine a candidate trajectory for an object at an iteration based on a pose, classification, velocity, or a combination thereof for the iteration, and may track the object over multiple iterations.

Control subsystem 158 may be principally responsible for generating suitable control signals for controlling the various controls in control system 110 in order to implement the planned trajectory of the vehicle 100.

It will be appreciated that the collection of components illustrated in FIG. 1 for vehicle control system 120 is merely exemplary in nature. Individual sensors may be omitted in some implementations. Additionally or alternatively, in some implementations multiple sensors of the types illustrated in FIG. 1 may be used for redundancy or to cover different regions around a vehicle, and other types of sensors may be used. Likewise, different types and combinations of control subsystems may be used in other implementations. Further, while subsystems 152-158 are illustrated as being separate from processors 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processors and memory. Subsystems in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize circuitry, processors, sensors or other components. Further, the various components in vehicle control system 120 may be networked in various manners.

In some implementations, vehicle 100 may also include a secondary vehicle control system (not illustrated), which may be used as a redundant or backup control system for vehicle 100. In some implementations, the secondary vehicle control system may be capable of fully operating autonomous vehicle 100 in the event of an adverse event in vehicle control system 120, while in other implementations, the secondary vehicle control system may only have limited functionality, e.g., to perform a controlled stop of vehicle 100 in response to an adverse event detected in primary vehicle control system 120. In still other implementations, the secondary vehicle control system may be omitted.

In addition, while powertrain 102, control system 110, and vehicle control system 120 are illustrated in FIG. 1 as being separate systems, in other implementations, some of all of these systems may be combined into a single system, e.g., with control system 110 and vehicle control system 120 combined into a single autonomous vehicle control system, or using other combinations. Further, in other implementations, some or all of the functionality illustrated as being within one system in FIG. 1 may be implemented in another system.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in vehicle 100, e.g., any cache memory in a processor, as well as any storage capacity used as a virtual memory, e.g., as stored on a mass storage device or on another computer or controller.

One or more processors illustrated in FIG. 1, or entirely separate processors, may be used to implement additional functionality in vehicle 100 outside of the purposes of autonomous control, e.g., to control entertainment systems, to operate doors, lights, convenience features, etc. Processors may also be implemented in whole or in part within individual sensors in some implementations.

In addition, for additional storage, vehicle 100 may also include one or more mass storage devices, e.g., one or more of a removable disk drive, a hard disk drive, a direct access storage device (DASD), an optical drive (e.g., a CD drive, a DVD drive, etc.), a solid state storage drive (SSD), network attached storage, a storage area network, and a tape drive, among others. Furthermore, vehicle 100 may include a user interface 164 to enable vehicle 100 to receive a number of inputs from and generate outputs for a user or operator, e.g., one or more displays, touchscreens, voice interfaces, gesture interfaces, buttons and other tactile controls, etc. Otherwise, user input may be received via another computer or electronic device, e.g., via an app on a mobile device or via a web interface.

Moreover, vehicle 100 may include one or more network interfaces, e.g., network interface 162, suitable for communicating with one or more networks (e.g., one or more of a LAN, a WAN, a wireless network, and the Internet, among others) to permit the communication of information with other computers and electronic devices, including, for example, a central service, such as a cloud service, from which vehicle 100 receives environmental and other data for use in autonomous control thereof.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network, e.g., in a distributed, cloud-based, or client-server computing environment, whereby the processing required to implement the functions of a computer program may be allocated to multiple computers or services over a network.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter will be described in the context of fully functioning computers and systems, it will be appreciated that the various implementations described herein are capable of being distributed as a program product in a variety of forms, and that implementations may be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

MIMO Radar Sensors

FIG. 2 next illustrates an example radar sensor 200 within which the various techniques described herein may be implemented. In some implementations, radar sensor 200 may be a distributed radar sensor. In some implementations, sensor 200 includes one or more MIMO radar transceivers (e.g., transceivers 202A and 202B) coupled to a controller 204, with each MIMO radar transceiver generally including multiple transmit (Tx) antennas (e.g., transmit antennas 206A, 206B) and multiple receive (Rx) antennas (e.g., receive antennas 208A, 208B) to implement a phased antenna array.

Each transceiver 202A, 202B may be disposed on a separate integrated circuit (IC) or chip in some implementations, while in other implementations multiple transceivers may be disposed on the same chip. Further, multiple transceivers 202A, 202B may be disposed on separate or common modules, boards, cards, or housings in various implementations. In addition, it will be appreciated that, rather than utilizing transceivers that handle both transmission and reception of radar signals, some implementations may utilize separate circuitry for these functions.

Controller 204 is generally coupled to one or more transceivers. For example, controller 204 is coupled to each transceiver 202A, 202B for controlling both (i) the generation of radar signals for transmission or emission by transmit antennas 206A, 206B and (ii) the reception and processing of radar signals received by receive antennas 208A, 208B. It will be appreciated that the functionality implemented by controller 204 may be allocated in various manners in different implementations, e.g., using one or more chips that are separate from each transceiver 202A, 202B and disposed on the same or different module, board, card or housing, or being wholly or partially integrated into the same chips as one or more of the transceivers. The functionality of controller 204 may also be at least partially implemented external of any radar sensor in some implementations, e.g., integrated into other processors or controllers in the vehicle control system of an autonomous vehicle. Further, while a single controller 204 is illustrated in FIG. 2, the invention is not so limited, as multiple controllers may be used to implement different functionality in a radar sensor in some implementations, e.g., using multiple controllers integrated with each transceiver 202A, 202B. In some implementations, one or more of controller 204 and transceivers 202A, 202B may be implemented using one or more Monolithic Microwave Integrated Circuits (MMICs).

As such, it will be appreciated that the functionality described herein may in some implementations be implemented using various types of control logic, whether integrated into a transmitter, receiver or transceiver, processor, controller, computer system, etc., whether disposed on one or more integrated circuit chips, and whether incorporating hardwired logic or programmable logic capable of executing program code instructions. Control logic may also be considered to include analog circuitry, digital circuitry, or both in various implementations. As such, the invention is not limited to the particular control logic implementation details described herein.

Likewise, transmit antennas 206A, 206B and receive antennas 208A, 208B may be implemented in a wide variety of manners, e.g., as patch antennas disposed on one or more printed circuit boards or cards, or in some instances disposed on or in a package or chip and thus integrated with a transceiver or controller of the radar sensor, e.g., using antenna on packaging (AOP) or antenna on chip (AOC) technology. Antennas 206A, 206B, 208A, 208B may be omnidirectional or directional in different implementations. In some implementations, the same antennas may be used for both transmit and receive; however, in the illustrated implementations, separate antennas are used to handle the transmission and reception of radar signals. Therefore, a reference to an antenna as being a transmit antenna or a receive antenna herein does not necessarily require that the antenna be used exclusively for that purpose.

Antennas 206A, 206B, 208A, 208B in the illustrated implementations are desirably physical arranged and electronically controlled to implement a MIMO virtual antenna array (VAA), i.e., an array of virtual array elements that individually represent unique transmit/receive antenna pairs. FIG. 3, for example, illustrates an example virtual antenna array 220 formed from a set of three physical transmit antennas 222 (Tx1, Tx2, Tx3, each of which corresponding, for example, to a transmit antenna 206A, 206B in FIG. 2) and four physical receive antennas 224 (Rx1, Rx2, Rx3, Rx4, each of which corresponding, for example, to a receive antenna 208A, 208B in FIG. 2), which together form a virtual antenna array having a 3×4 or 12 element array of virtual array elements 226, thereby increasing the effective number of antennas and improving cross-range resolution. It will be appreciated that different numbers or arrangements of physical transmit and receive antennas may be used to form different sizes and arrangements of virtual antenna arrays, so the invention is not limited to the specific array illustrated in FIG. 3.

Increasing the numbers of physical transmit antennas and physical receive antennas for a virtual antenna array, and thus the number of virtual array elements in the virtual antenna array, may generally be used to increase angular resolution, detection range, or signal to noise ratio. In one example implementation, an individual transceiver chip having three transmit antennas and four receive antennas may be used to form a virtual antenna array having twelve virtual array elements, which may, in some instances, be used to form a one dimensional array of <5 cm length (e.g., emphasizing azimuth resolution) or in other instances form a two dimensional of at most about 1 cm×1 cm (e.g., providing coarse resolution in both azimuth and elevation). If four of such transceiver chips are used in the same virtual antenna array, however, a total of 12 transmit antennas and 16 receive antennas may be used to generate 192 virtual array elements. Such element counts may be used for example, to generate two dimensional array layouts over about a 10 cm×10 cm area, and allowing for an angular resolution of a few degrees in both azimuth and elevation.

Now turning to FIGS. 4 and 5, these figures respectively illustrate example transmit and receive channels or paths for individual transmit and receive antennas 206A, 206B, 208A, 208B in transceiver 202A (it being understood that similar components may be used for other transceivers such as transceiver 202B). While the techniques described herein may be applicable to pulse modulated radar sensors or any other types of radar sensors, the illustrated implementations will focus on MIMO radar sensors that utilize millimeter wave frequency modulated continuous wave (FMCW) radar signals.

In the transmit channel of transceiver 202A as illustrated in FIG. 4, a local oscillator (LO) 230 generates an FMCW radio frequency (RF) signal, e.g., in the range of 76 GHz to 81 GHz. The FMCW RF signal is amplified by an amplifier 232 to drive a transmit antenna 206A. The frequency of LO 230 is determined by a modulator block 234, which is capable of frequency modulating LO 230 to effectively generate pulsed signals or sweep signals referred to as chirps, e.g., using sawtooth or another form of frequency modulation. Control over modulator block 234 may be provided by a controller 236, which in some instances may be controller 204, while in other instances may be other control logic, e.g., as may be integrated into transceiver 202A. Controller 236 may be used to control various parameters of the chirps, e.g., start frequency, phase, chirp rate, etc., as well as to trigger the initiation of a chirp.

In the receive channel of transceiver 202A as illustrated in FIG. 5, a received RF signal from an antenna 208A is amplified by an amplifier 238 and then mixed with the LO 230 signal by a mixer 240 to generate a mixed signal. The mixed signal is filtered by a filter 242 and digitized by an analog to digital converter (ADC) 244 to generate a stream of digital signals. For example, the digital signals can be data samples, which in the illustrated implementation may be considered to be digital values output by ADC 244, and which may in some implementations include other identifying data such as the channel, transmit antenna, receive antenna, chirp number, timestamp, etc. associated with the digital value. The digital signals are provided to controller 236.

It will be appreciated that in different implementations, various components among components 230-244 of FIGS. 4 and 5 may be shared by multiple transmit channels or multiple receive channels and that multiple instances of some components may be dedicated to different channels. Further, other architectures may be used to implement transmit channels or receive channels in other implementations, so the invention is not limited to the specific architecture illustrated in FIGS. 4-5. In addition, in some implementations, controller 236 may be replaced by controller 204 of radar sensor 200. In these implementations, controller 204 of radar sensor 200 may control one or more components of components 230-244 described with reference to FIGS. 4 and 5.

Figure 6:
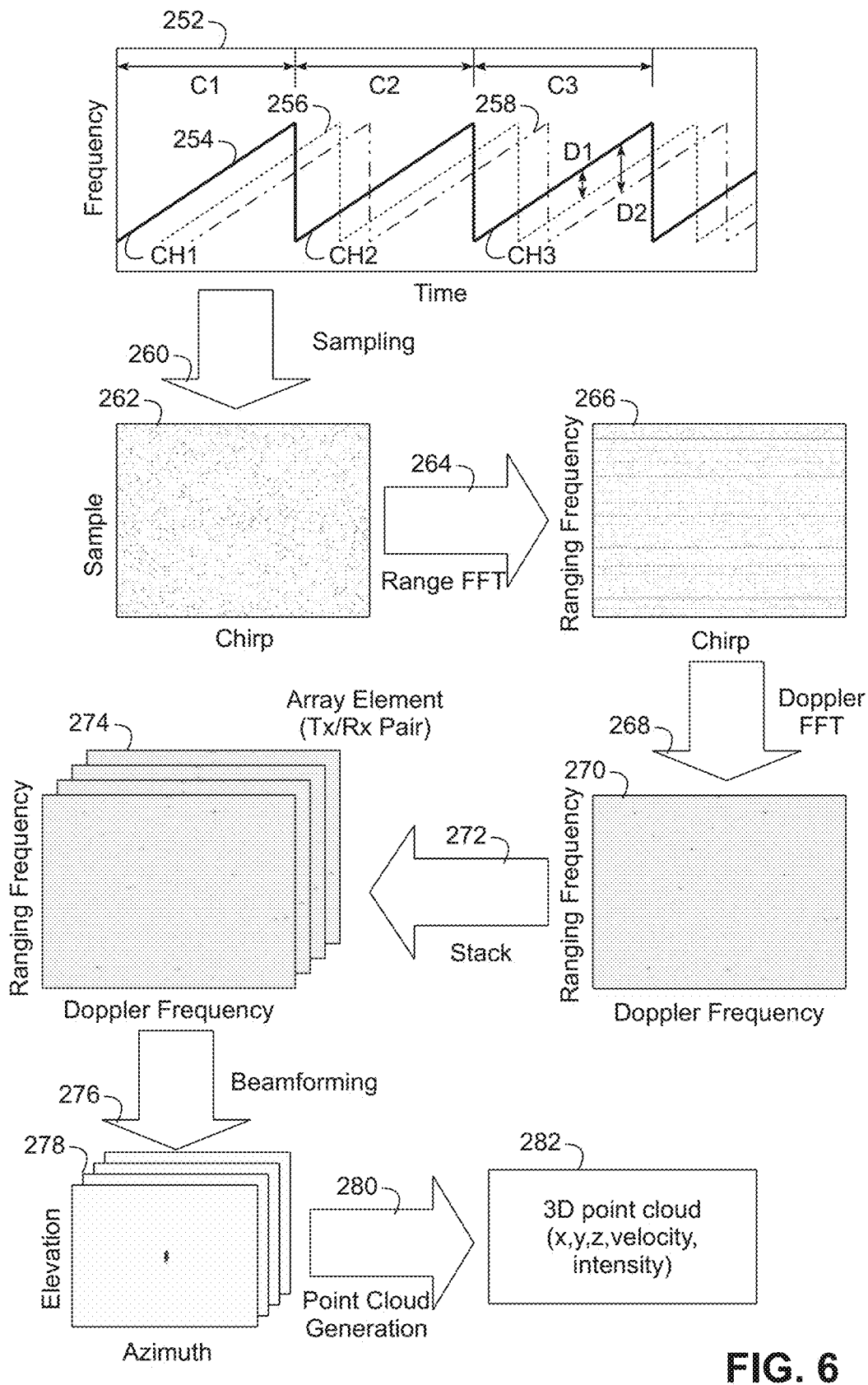
FIG. 6 illustrates an example process for sensing targets in an environment with various implementations disclosed herein.

FIG. 6 next illustrates diagrams showing general operations of a radar sensor and data generated by the radar sensor. For example, the radar sensor may be an FMCW MIMO radar sensor such as radar sensor 200 discussed above in connection with FIGS. 2-5. Graph 252, for example, illustrates a simplified time vs. frequency graph of a sequence of chirps. A chirp may represent a sweeping signal across frequency in a certain cycle. For example, a chirp CH1 is a sweeping signal during cycle C1, a chirp CH2 is a sweeping signal during cycle C2, and a chirp CH3 is a sweeping signal during cycle C3. In this example, chirps CH1-CH3 are illustrated as repetitions of sweeping signals having the same shape. However, in some implementations, chirps may dwindle over time. In addition, in this example graph, chirps C1-C3 are linearly modulated to have a sawtooth shape. However, in some implementations, the chirps may be modulated non-linearly or may be modulated to have any shape. Graph 252 shows both a transmitted signal 254 (which matches the frequency of the local oscillator) for a transmit channel Tx and received signals 256, 258 for two targets located at difference ranges and received by a receive channel Rx. In this example, the transmitted signal 254 represents a sequence of chirps. As shown in this graph, the time delay from transmission of the transmit signal to being received for the two targets causes a difference in frequency, e.g., illustrated by D1 for a first target and D2 for a second target.

In some implementations, data samples collected by radar sensor 200 may be processed to generate radar data associated with certain features. For example, the radar data may be represented as data cubes associated with certain features. The features may be represented as dimensions of the data cubes where the features include, but are not limited to, fast time (the number of samples in one chirp), slow time (the number of chirps in one set of chirps), and the number of receive channels. Where a local oscillator is operated at about 77 GHz, a controller (e.g., controller 204 in FIG. 2 or controller 236 in FIGS. 4 and 5) may process received data samples such that each frame may include 128-512 chirps and 512-1024 samples per chirp. In this example, a frame firing duration (also referred to as a coherent processing interval (CPI) may be about 5-15 ms/frame, a sample rate may be about 20 million samples/second, and a chirp duration may be about 25-100 microseconds per chirp. In some implementations, receive channels (e.g., about 4-16 Rx channels) may be processed in parallel. Although specific numbers are provided in this paragraph, they are provided as examples and any suitable numbers can be used to implement radar sensors.

Radar data (e.g., data cubes) may be processed to determine, for one or more targets in the field of view of a radar sensor, (i) range from the radar sensor to a respective target, (ii) Doppler velocity (i.e., radial velocity of the respective target relative to the radar sensor), or (iii) angle of arrival, in terms of one or both of azimuth and elevation. First, as illustrated at 260, sampling may be performed on each receive channel over multiple chirps in a frame or CPI. The samples for all of the chirps in the frame for a particular Tx/Rx pair may be incorporated into a two dimensional array 262 where the samples are arranged in one dimension by sample number (vertical axis of FIG. 6, from first sample to last sample collected for each chirp) and in another dimension by chirp number (horizontal axis of FIG. 6, from first chirp to last chirp in a frame). In one example implementation, for example, where a frame includes 128 chirps with 1024 samples in each chirp, the array may have dimensions of 128 (horizontal)×1024 (vertical).

Next, range measurements are determined for the samples in each channel, generally by performing a Fast Fourier Transform (FFT) operation 264 (referred to herein as a range FFT), or other frequency transformation, which recovers the frequency spectrum from the digital samples in each channel to generate a range profile (power vs. range) in the frequency domain for each chirp for a particular Tx/Rx pair. It will be appreciated, in particular, that a target at a given range from a radar sensor will delay the transmitted signal 254 by a delay that is proportional to its range, and that this delay remains substantially constant over a chirp. Given that the mixed signal output by mixer 240 of FIG. 5 is effectively the difference in the instantaneous frequencies of the transmitted and received signals within a given channel, and that this difference is substantially constant over a chirp, the reflection corresponding to the target effectively generates a constant frequency "tone" in the mixed signal that resolves to a peak in the frequency domain at that frequency. Multiple targets therefore resolve to a range profile having different peaks in the frequency domain corresponding to the ranges of those targets, and may be grouped in some implementations into frequency bins corresponding to different ranges in the field of view of the radar sensor.

Each range profile for a particular chirp may be considered to be a one dimensional array representing power over a range of frequencies for that chirp. The range profiles for the chirps in the frame may therefore also be stacked into an array 266 having one dimension representing ranging frequency or frequency bin (vertical axis in FIG. 6) and one dimension representing chirp number (horizontal axis in FIG. 6), and it may be seen by the representation of array 266 that horizontal lines generally represent frequency bins where potential targets at various ranges corresponding to those frequency bins have been detected over the course of multiple chirps in a frame.

Next, velocity measurements (e.g., Doppler measurements) are determined for the samples in each channel, generally by performing a second FFT operation 268 (referred to herein as a Doppler FFT) to recover phase information corresponding to Doppler shifts. Transforming across the set of chirps results in a data set that may be represented by an array 270 arranged by ranging frequency or frequency bin (vertical axis) and Doppler frequency or frequency bin (horizontal axis), where each Doppler frequency bin generally corresponds to a particular velocity for a potential target disposed within a particular range frequency bin.

Next, beamforming is performed to determine angle of arrival information. It should be noted that arrays 262, 266 and 270 are each based on the samples for a single transmit channel/receive channel (Tx/Rx) pair. Thus, a stacking operation 272 may be performed to stack the arrays 270 generated by the Doppler FFT operation for different Tx/Rx pairs (also referred to as array elements) into a data stack 274.

It will be appreciated that each different Tx/Rx pair may have a different spatial relationship between the respective physical transmit and receive antennas for the pair, which can lead to slightly different phases reported for the same target for different Tx/Rx pairs. In the case of a uniform linear array, a third FFT operation 276 (referred to herein as a beamforming FFT) may therefore use the set of values across the different array elements in stack 274 (also referred as a beamvector) to estimate an angle of arrival at each range-Doppler location (i.e., each combination of range frequency bin and Doppler frequency bin). More generally, a set of complex responses expected for some set of azimuth and elevation angles of arrival, also known as steering vectors, may be multiplied onto the beamvectors to generate azimuth and elevation angles for each target (represented by graphs 278).

Then, the aforementioned range, Doppler and angle of arrival information may be combined in some implementations by a point cloud generation operation 280 into a three dimensional point cloud 282 including estimated position (e.g., using cartesian or polar coordinates), velocity, and signal intensity (or confidence) for a plurality of targets in the field of view of the radar sensor.

It will be appreciated that a wide variety of modifications and enhancements may be made to the aforementioned operations of FIG. 6, so the invention is not limited to this specific sequence of operations.

Those skilled in the art, having the benefit of the present disclosure, will recognize that the exemplary environment illustrated in FIGS. 1-6 is not intended to limit implementations disclosed herein. Indeed, those skilled in the art will recognize that other alternative hardware or software environments may be used without departing from the scope of implementations disclosed herein. It will also be appreciated that the various MIMO radar techniques described herein may be utilized in connection with other applications, so the invention is not limited to MIMO radars or radar sensing systems used solely in connection with the control of an autonomous vehicle.

Distributed Radar Antenna Array Aperture

Figure 7:
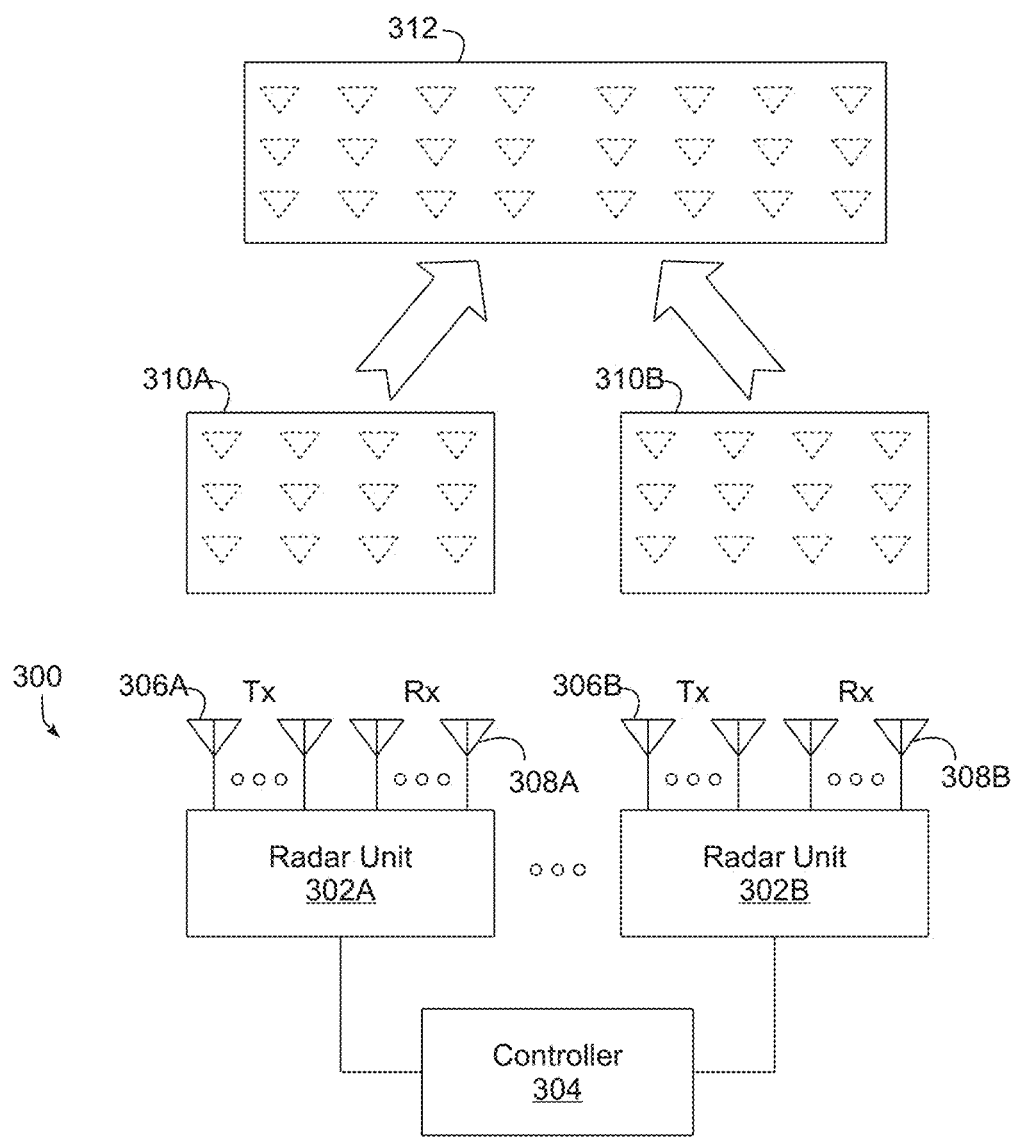
FIG. 7 illustrates an example implementation of a multi-sensor radar system utilizing a distributed radar antenna array aperture consistent with some aspects of the invention.

Now turning to FIG. 7, it may be desirable in some implementations to utilize multiple MIMO radar sensors or units having overlapping fields of view to effectively synthesize a distributed radar antenna array aperture from the outputs of the multiple radar sensors and effectively enhance one or more of angular resolution, range, and signal to noise ratio beyond that supported by any of the radar sensors individually. In some instances, and as will be discussed in greater detail below, the techniques described herein may be used to enable radar sensors that otherwise would have insufficient angular resolution on their own to adequately discriminate between various objects in the environment of an autonomous or other vehicle to be used collectively by a vehicle control system in connection with the autonomous control of a vehicle.

Specifically, FIG. 7 illustrates a multi-sensor radar system 300 including a plurality of MIMO radar sensors or units (e.g., radar sensors 302A, 302B) operably coupled to one another by a controller 304. Each radar sensor 302A, 302B may be implemented as a MIMO radar sensor having one or more transmit (Tx) antennas (e.g., transmit antennas 306A, 306B) and one or more receive (Rx) antennas (e.g., receive antennas 308A, 308B) that form respective virtual antenna arrays 310A, 310B, which in the illustrated implementation are two dimensional virtual antenna arrays, although the invention is not so limited in other implementations. In some implementations, each radar sensor 302A, 302B may, for example, be implemented in any of the various manners discussed above for radar sensor 200 of FIGS. 2-6, and as will become more apparent below, the virtual antenna arrays 310A, 310B may be used to effectively synthesize a distributed radar antenna array aperture 312 that is effectively larger than and has an improved angular resolution over one or more of the individual virtual antenna arrays 310A, 310B. Controller 304, in the illustrated implementation, is separate from each MIMO radar sensor or unit 302A, 302B, and in some instances, may be dedicated controller, or in other instances, may be integrated into another controller or control system, e.g., the vehicle control system of an autonomous vehicle in an autonomous vehicle application. In other implementations, controller 304 may be implemented in other controllers or control systems, whether local to or remote from the radar sensors, while in other implementations, the controller may be integrated wholly or partially into one or more of the radar sensors 302A, 302B. Other variations will be apparatus to those of ordinary skill having the benefit of the instant disclosure.

It will be appreciated that coherently fusing the apertures from multiple distributed virtual antenna sub-arrays, e.g., in cascaded radar systems, generally requires the use of a common Local Oscillator (LO) signal shared across all the transmitters and receivers in the entire cascade system. A master module in such a system generally controls the radar chirp/frame timing for all of the chips and modules in the system by generating a digital synchronization signal and sharing this synchronization signal with other, slave radar modules. The master module also generally is required to generate an oscillator clock and share it with the slave modules to ensure that the entire system operates from a single clock source. It has been found, however, that such synchronization is expensive and difficult to achieve, particularly when trying to generate a large (e.g., greater than 30 cm) synchronized aperture. Given that in many automotive applications, LO signals of 20+ GHz are used, sharing such high frequency signals across different chips or hardware modules is ordinarily unachievable without the use of specialized and expensive circuit boards and materials.

In the herein-described implementations, however, a coherent distributed array radar (DAR) may be generated without the use of any LO or clock synchronization among the radar sub-arrays, by coherently comparing the residual phases after range-doppler extraction from all the channels in the whole DAR system. It has been found, in particular, that the residual phases in the Tx/Rx channels are linearly proportional to the ranges between the antennas and the targets. Thus, within physical and temporal alignment constraints that are generally achievable in typical automotive environments, a phase gradient approach may be used to derive an element-wise phase correction function to address such misalignments. Such an approach is data driven and capable of adequately correcting shifts/rotations of different physical apertures relative to one another, thereby allowing multiple radar sub-arrays to synthesize a distributed array radar (DAR) having enhanced angular resolution, enhanced detection range, and enhanced signal to noise ratio.

In some implementations, as noted above, the different radar sub-arrays may be implemented using separate radar sensors or units having overlapping fields of view, e.g., separate radar sensors mounted in relative proximity to one another and facing in the same general direction, such that at least a portion of the field of view of each radar sensor overlaps that of the other radar sensor. While it is generally desirable to position the radar sensors in fixed locations relative to one another such that the spatial relationship between the different radar sensors both fixed and known, the precision of the spatial relationships is generally not required to be great, such that, for example, multiple radar sensors may be mounted on a common bracket or on predetermined locations on an automobile to achieve sufficient spatial positioning to synthesize an aperture with enhanced angular resolution, enhanced detection range, and enhanced signal to noise ratio. Moreover, the temporal relationship between different radar sensors is also desirably controlled, e.g., by using a trigger signal or other synchronization signal (e.g., a Precision Time Protocol (PTP) signal) that synchronizes one or both of the sensing frames and chirps emitted by the radar sensors. The precision required to provide adequate temporal alignment between the different radar sensors, however, is well below that which would be achieved with a shared LO or clock signal.

Moreover, as noted above, in some implementations, the radar sensors lack a common LO signal or clock signal, and in some implementations, the radar sensors may be completely separate units that operate independently and generate independent outputs that may be synthesized to form the distributed aperture, e.g., using a controller that is separate from any of the radar sensors. Thus, the radar sensors may be considered to operate using separate local oscillators and separate clocks. Further, in some implementations, radar sensors predominantly used for lower resolution automotive applications such as foot-activated tailgates, adaptive cruise control, lane change assist, and other driver assistance applications may be utilized in a DAR system using the herein-described techniques. It will be appreciated that such radar sensors, when used alone, generally lack sufficient angular resolution, detection range, or signal to noise ratio for higher resolution radar imaging applications.

In some implementations, data is captured independently on separate radar sensors, a set of expected array responses for various angles (e.g., steering vectors) is generated across the distributed aperture according to all of the channels' relative locations using calculated residual phase relations, and angles may be extracted using the steering vectors to obtain the enhanced resolution from the distributed aperture.

Figure 8:
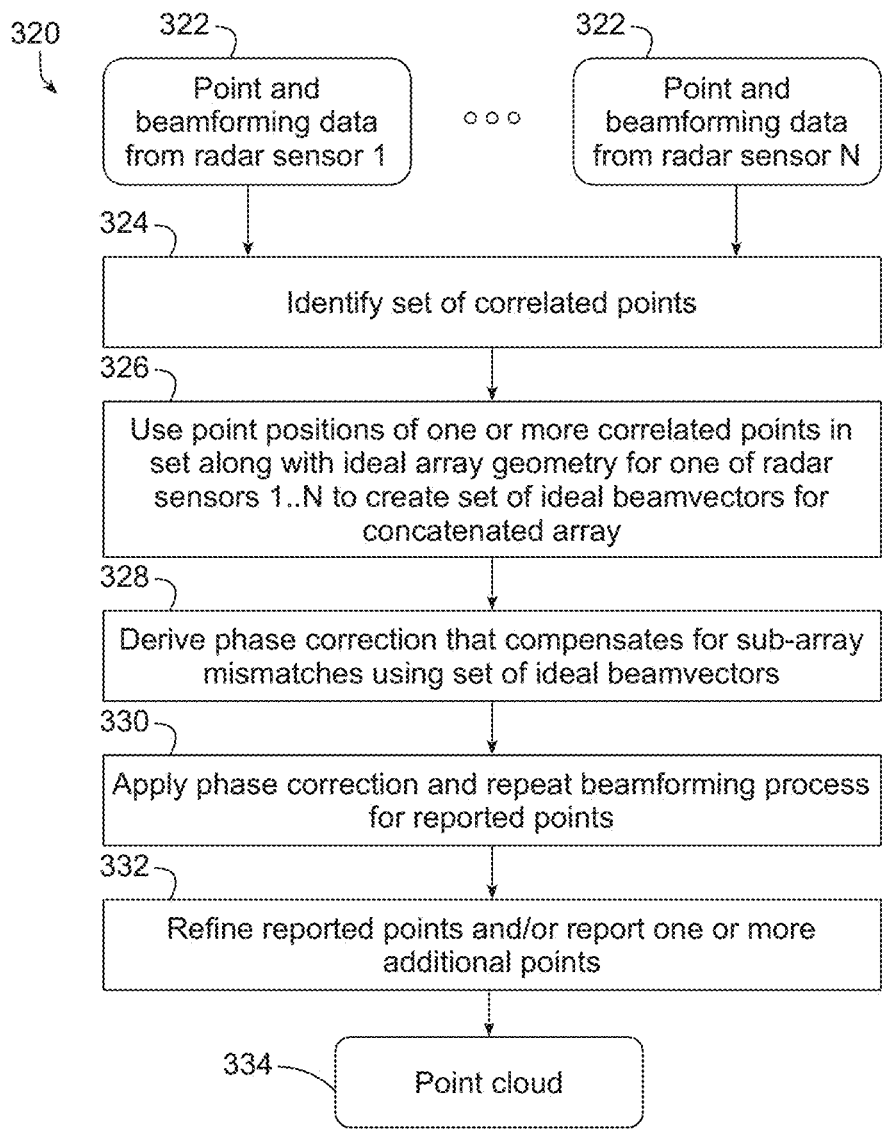
FIG. 8 illustrates an example implementation of a method for sensing objects in an environment using the multi-sensor radar system of FIG. 7.

FIG. 8, for example, illustrates an example sequence of operations 320 for sensing objects in an environment using multi-sensor radar system 300 of FIG. 7, e.g., as may be implemented in controller 304. As shown in blocks 322, each radar sensor may provide, e.g., for each sensing frame, point data and beamforming data (e.g., associated beamvectors) generated by the radar sensor during that sensing frame. The point data, for example, may include positional information for one or more points (also referred to herein as targets). In some instances, the point data may be provided as point cloud data that identifies one or more points or targets, and for each point or target, a position (e.g., in cartesian or polar coordinates), a velocity and an intensity. Other radar sensor output data that may be used to identify at least the position of a point or target sensed by the radar sensor may be provided in the alternative, e.g., based upon the particular radar sensor used, as will be appreciated by those of ordinary skill having the benefit of the instant disclosure, and it will be appreciated that other manners of representing a point's position, e.g., a localized multidimensional spectrum in the neighborhood of a detection, may be used in other implementations. It will also be appreciated that while in the illustrated implementation both velocity and intensity are provided for each sensed point, in other implementations, no velocity or intensity information may be provided.

In addition, in the illustrated implementation, each radar sensor also provides beamforming data (e.g., beamvector data) associated with one or more angles of arrival (e.g., elevation, azimuth or both) for one or more points or targets sensed by the radar sensor. In some implementations, for example, the beamforming information may include a beamvector for each target, such as the set of values used for a beamforming operation across the different array elements associated with various receive channels for the radar sensor for the range-Doppler location associated with the target. Other manners of representing beamforming information associated with one or more points reported by a radar sensor may be used in other implementations. In some implementations, given the similarity in chirp/data acquisition parameters as the radar sensors are operated concurrently, the range-Doppler spaces for all of the radar sensors may be aligned to effectively associate the beamvector data from each radar sensor, which while being more data intensive may provide a more complete solution that considers all of the beamvectors from the range-Doppler space rather than just those beamvectors associated with detected and associated points. By providing only the beamforming data associated with detected points, however, the amount of data that each radar sensor is required to report is substantially reduced.

It will be appreciated that beamforming data in some implementations may be considered to be a form of intermediate data that is generally not reported by some radar sensors. As such, it may be desirable in some implementations to modify the radar sensors to report such intermediate data. Also, where each radar sensor has a variable sensing threshold, it may be desirable to reduce the sensing threshold on each sensor to include marginal points (e.g., points with one or both of lower intensity and lower confidence levels) that may benefit from the increased signal-to-noise ratio achieved with the herein-described techniques.

Based upon the aforementioned information collected from the radar sensors, block 324 identifies a set of one or more correlated points, i.e., points identified by at least two of the different radar sensors that with at least some confidence are considered to be associated with the same real world object. The correlated points may be identified in some implementations using a nearest neighbor spatial matching algorithm, or another suitable algorithm. In some implementations, the spatial matching may be based on range, Doppler and angle correspondence, although in other implementations other factors, e.g., intensity, may also be considered, while in other implementations, spatial matching may only be based on a subset of such factors, e.g., based upon matching one or both of range and Doppler bins to associate beamvectors. Further, in some implementations, points may be weighted based upon one or both of intensity and field of view, e.g., to prioritize points that are more intense, have higher confidences or are closer to the center of the field of view, or to ignore points that are less intense, are of lower confidence or are positioned more towards the periphery of the field of view (which may focus performance enhancements on the portions of the field of view that are of potentially greater relevance).

Next, in block 326, one or more points from the set of correlated points are used along with an ideal array geometry for one of the radar sensors to create a set of ideal beamvectors for the concatenated array. In particular, based upon a known relative position of each antenna in each radar sensor (based, in part, on a known position of each antenna in each radar sensor as well as the known position of each radar sensor relative to the other radar sensors), a set of ideal beamvectors for the concatenated array may be determined, e.g., by calculating the relative phase shifts across all the antenna elements in the MIMO virtual array, which is generally proportional to the transmission delay between the associated points to the antenna elements. For example, in some implementations, the relative phases for a point at a certain azimuth, elevation and distant range may be calculated for each Tx/Rx pair by calculating the distance from the Tx antenna to the point back to the Rx antenna, e.g., using the equation phase=$2\pi$*(total_range)/wavelength. The process may be repeated for all Tx/Rx pairs. The point position for the particular azimuth/elevation is also constant.

Next, in block 328, a phase correction may be derived that compensates for one or both of temporal and spatial sub-array mismatches through a comparison between the set of ideal beamvectors and the actual beamvectors for each sub-array, e.g., by first correlating the ideal beamvectors and actual beamvectors to estimate the phase correction, and then removing any linear phase shift components in the estimated phase corrections, as it will be appreciated that after range and Doppler extraction, the dominating residual phase of a receive channel signal will be linearly proportional to the distance from the antenna to the target.

In particular, in some implementations, and assuming for example a radar system incorporating two radar sensors, for each return associated between the two radar sensors, A may be considered to be the idealized beamvector and B may be considered to be the concatenated beamvectors of the two radar sensors. A phase difference may be calculated is the equation A*complex_conjugate(B)), and as such, the phase difference may be a unitary complex vector the same length as A and B. This process may be performed to compute the estimated disparity between each ideal and measured set. It will be appreciated, however, that each disparity comes with an additional random phase offset, so simply averaging the phase differences may not provide a suitable estimate. As such, in some implementations, a phase gradient (i.e., a derivative) of each may be computed, which may remove the additional random phase and allow the set to be averaged. After averaging, the estimate may be re-integrated to form the final phase correction.

Next, in block 330, the determined phase correction is applied, and then the beamforming process (e.g., a beamforming FFT operation) is repeated for the reported points from one or more of the radar sensors. Then, as illustrated in block 332, one or more reported points may be refined (i.e., such that the concatenated array improves the positional accuracy of the positional information for a point), one or more additional points may be determined (i.e., such that the concatenated array identifies one or more points that were not identified by one or more of the sub-arrays), or both. An example of the former improvement is one in which the angle of arrival for a point is refined to a more accurate position, while an example of the latter improvement is one in which points that were determined to be the same target from multiple sub-arrays are instead determined to be for different targets having different corresponding angles of arrival. As such, a point cloud 334 (or other suitable radar output format) including the refined or additional points may be reported by block 332.

Thus, a combined point cloud (or other suitable radar output) may be reported by system 300, representing the target(s) collectively sensed by the multiple individual radar sensors 302A, 302B, and generally with enhanced angular resolution, enhanced detection range and enhanced signal-to-noise ratio.

Other variations will be apparent to those of ordinary skill. Therefore, the invention lies in the claims hereinafter appended.

What is claimed is:

1. A method, comprising:
  receiving first radar data from a first multiple input multiple output (MIMO) radar sensor disposed on a vehicle, the first MIMO radar sensor including one or more transmit antennas and one or more receive antennas forming a first radar sub-array, and the first radar data including first point data identifying one or more points sensed by the first MIMO radar sensor and first beamforming data from the first radar sub-array;
  receiving second radar data from a second MIMO radar sensor disposed on the vehicle, the second MIMO radar sensor having a field of view that overlaps with that of the first MIMO radar sensor and including one or more transmit antennas and one or more receive antennas forming a second radar sub-array, and the second radar data including second point data identifying one or more points sensed by the second MIMO radar sensor and second beamforming data from the second radar sub-array; and synthesizing a distributed array from the first and second radar sub-arrays by applying a phase correction that compensates for temporal or spatial mismatches between the first and second radar sub-arrays using the first and second point data and the first and second beamforming data and thereafter performing a beamforming operation on one or more points in the first or second point data after the phase correction is applied to refine the one or more points;

wherein the first beamforming data includes an actual beamvector for each of the one or more points sensed by the first MIMO radar sensor and the second beamforming data includes an actual beamvector for each of the one or more points sensed by the second MIMO radar sensor, wherein synthesizing the distributed array further includes identifying one or more correlated points from the first and second point data, and wherein applying the phase correction includes:

generating a set of ideal beamvectors for one of the first and second radar sensors based upon the identified one or more correlated points; and generating the phase correction by comparing the set of ideal beamvectors to the actual beamvectors in the first and second beamforming data.

2. The method of claim 1, wherein the first and second MIMO radar sensors operate using separate local oscillators.

3. The method of claim 1, wherein the first and second MIMO radar sensors operate using separate clocks.

4. The method of claim 1, wherein the first point data includes a point cloud, the point cloud identifying a position and a velocity for each of the one or more points sensed by the first MIMO radar sensor.

5. The method of claim 1, wherein generating the set of ideal beamvectors includes, for a first point from the one or more correlated points, calculating a relative phase for each of a plurality of transmitter/receiver pairs, wherein calculating the relative phase for each of the plurality of transmitter/receiver pairs includes, for a first transmitter/receiver pair of the plurality of transmitter receiver pairs, calculating a distance from a first transmitter of the first transmitter/receiver pair to the first point and to a first receiver of the first transmitter/receiver pair, and wherein comparing the set of ideal beamvectors to the actual beamvectors in the first and second beamforming data includes:

correlating the set of ideal beamvectors with the actual beamvectors in the first and second beamforming data to estimate a phase correction; and removing a linear phase shift component from the estimated phase correction.

6. The method of claim 5, wherein correlating the set of ideal beamvectors with the actual beamvectors in the first and second beamforming data to estimate the phase correction includes determining an estimated disparity between the set of ideal beamvectors and the actual beamvectors in the first and second beamforming data and calculating a phase gradient of the estimated disparity to remove a random phase offset.

7. The method of claim 6, wherein performing the beamforming operation refines a position of at least one of the one or more points in the first or second point data.

8. The method of claim 6, wherein performing the beamforming operation determines an additional point.

9. The method of claim 6, wherein identifying the one or more correlated points is performed using a nearest neighbor spatial matching algorithm based on range, Doppler and angle of arrival correspondence between points in the first and second point data.

10. A vehicle radar system, comprising:
a memory;
one or more processors; and
program code resident in the memory and configured upon execution by the one or more processors to:
receive first radar data from a first multiple input multiple output (MIMO) radar sensor disposed on the vehicle, the first MIMO radar sensor including one or more transmit antennas and one or more receive antennas forming a first radar sub-array, and the first radar data including first point data identifying one or more points sensed by the first MIMO radar sensor and first beamforming data from the first radar sub-array, wherein the first beamforming data is generated by performing a first beamforming operation in the first MIMO radar sensor;
receive second radar data from a second MIMO radar sensor disposed on the vehicle, the second MIMO radar sensor having a field of view that overlaps with that of the first MIMO radar sensor and including one or more transmit antennas and one or more receive antennas forming a second radar sub-array, and the second radar data including second point data identifying one or more points sensed by the second MIMO radar sensor and second beamforming data from the second radar sub-array, wherein the second beamforming data is generated by performing a second beamforming operation in the second MIMO radar sensor; and
synthesize a distributed array from the first and second radar sub-arrays by applying a phase correction that compensates for temporal or spatial mismatches between the first and second radar sub-arrays using the first and second point data and the first and second beamforming data and thereafter performing a repeated beamforming operation on one or more points in the first or second point data after the phase correction is applied to refine the one or more points.

11. The vehicle radar system of claim 10, further comprising the first MIMO radar sensor.

12. The vehicle radar system of claim 11, wherein the one or more processors are disposed in the first MIMO radar sensor.

13. The vehicle radar system of claim 11, further comprising the second MIMO radar sensor, wherein the one or more processors are disposed external of each of the first and second MIMO radar sensors.

14. The vehicle radar system of claim 10, wherein the first point data includes a point cloud, the point cloud identifying a position and a velocity for each of the one or more points sensed by the first MIMO radar sensor.

15. The vehicle radar system of claim 10, wherein the first beamforming data includes an actual beamvector for each of the one or more points sensed by the first MIMO radar sensor and the second beamforming data includes an actual beamvector for each of the one or more points sensed by the second MIMO radar sensor.

16. The vehicle radar system of claim 15, wherein the program code is configured to synthesize the distributed array further by identifying one or more correlated points from the first and second point data, and wherein the program code is configured to apply the phase correction by:

generating a set of ideal beamvectors for one of the first and second radar sensors based upon the identified one or more correlated points; and generating the phase correction by comparing the set of ideal beamvectors to the actual beamvectors in the first and second beamforming data.

17. The vehicle radar system of claim 16, wherein the repeated beamforming operation refines a position of at least one of the one or more points in the first or second point data.

18. The vehicle radar system of claim 16, wherein the repeated beamforming operation determines an additional point.

19. The vehicle radar system of claim 16, wherein the program code is configured to identify the one or more correlated points using a nearest neighbor spatial matching algorithm based on range, Doppler and angle of arrival correspondence between points in the first and second point data.

20. A program product, comprising:

a non-transitory computer readable medium; and program code stored on the non-transitory computer readable medium and configured upon execution by one or more processors to:

receive first radar data from a first multiple input multiple output (MIMO) radar sensor disposed on the vehicle, the first MIMO radar sensor including one or more transmit antennas and one or more receive antennas forming a first radar sub-array, and the first radar data including first point data identifying one or more points sensed by the first MIMO radar sensor and first beamforming data from the first radar sub-array, wherein the first beamforming data is generated by performing a first beamforming operation in the first MIMO radar sensor;

receive second radar data from a second MIMO radar sensor disposed on the vehicle, the second MIMO radar sensor having a field of view that overlaps with that of the first MIMO radar sensor and including one or more transmit antennas and one or more receive antennas forming a second radar sub-array, and the second radar data including second point data identifying one or more points sensed by the second MIMO radar sensor and second beamforming data from the second radar sub-array, wherein the first beamforming data is generated by performing a first beamforming operation in the first MIMO radar sensor; and synthesize a distributed array from the first and second radar sub-arrays by applying a phase correction that compensates for temporal or spatial mismatches between the first and second radar sub-arrays using the first and second point data and the first and second beamforming data and thereafter performing a repeated beamforming operation on one or more points in the first or second point data after the phase correction is applied to refine the one or more points.

\* \* \* \* \*